(12) United States Patent
Hiraoka

(10) Patent No.: US 6,847,718 B1
(45) Date of Patent: Jan. 25, 2005

(54) REMOTE POWER FEED METHOD AND SYSTEM

(75) Inventor: Toshihide Hiraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 585 days.

(21) Appl. No.: 09/644,707

(22) Filed: Aug. 24, 2000

(30) Foreign Application Priority Data

Aug. 24, 1999 (JP) .......................................... 11-237185

(51) Int. Cl.[7] .......................... H04M 1/00; H04M 9/00
(52) U.S. Cl. ..................... 379/413; 379/1.01; 379/9.05; 379/324; 379/348; 379/413.02; 700/286; 363/146
(58) Field of Search ............................. 379/1.01, 1.03, 379/28, 93.06, 93.09, 379, 399.01, 413, 322, 323, 324, 348, 413.02; 700/286; 363/146

(56) References Cited

U.S. PATENT DOCUMENTS

| | | | |
|---|---|---|---|
| 6,075,784 A | 6/2000 | Frankel et al. | |
| 6,272,209 B1 * | 8/2001 | Bridger et al. | ........... 379/27.01 |
| 6,295,293 B1 | 9/2001 | Tonnby et al. | |
| 6,320,857 B1 | 11/2001 | Tonnby et al. | |
| 6,400,803 B1 * | 6/2002 | Tate et al. | ................ 379/27.06 |
| 6,510,204 B2 * | 1/2003 | De Clercq et al. | ............ 379/28 |
| 6,515,996 B1 | 2/2003 | Tonnby et al. | |
| 6,546,089 B1 * | 4/2003 | Chea et al. | ............... 379/93.06 |
| 6,574,313 B1 * | 6/2003 | Chea et al. | ............... 379/93.09 |
| 6,584,197 B1 * | 6/2003 | Boudreaux et al. | ..... 379/413.02 |
| 6,639,913 B1 | 10/2003 | Frankel et al. | |
| 6,738,981 B1 | 5/2004 | Tonnby et al. | |
| 2001/0036171 A1 | 11/2001 | Tonnby et al. | |
| 2002/0118676 A1 | 8/2002 | Tonnby et al. | |

FOREIGN PATENT DOCUMENTS

| | | |
|---|---|---|
| JP | 64-71262 | 3/1989 |
| JP | 7-131834 | 5/1995 |
| JP | 11-284773 | 10/1999 |
| JP | 2000-511724 | 9/2000 |
| JP | 2002-518879 | 6/2002 |

* cited by examiner

*Primary Examiner*—Binh Tieu
(74) *Attorney, Agent, or Firm*—Foley & Lardner LLP

(57) ABSTRACT

A remote power feeding method allowing efficient remote power feeding into a network termination device in the event of a commercial power failure at a subscriber site is disclosed. When the commercial power failure occurs, a power failure signal is transmitted from the subscriber-side network termination device to the central office-side line termination device. The central office-side line termination device, when receiving the power failure signal, starts DC power feeding to the subscriber-side network termination device via the subscriber line. During the power failure, only voice communication is permitted using previously selected good channels.

15 Claims, 5 Drawing Sheets

REMOTE POWER FEED METHOD AND SYSTEM

BACKGROUND OF THE INVENTION

1. Field of the Invention

The present invention relates to a method and system for feeding electrical power to a network termination device required for a DSL (Digital Subscriber Line) service.

2. Description of the Related Art

With the wide use of digital switching systems, an increasing number of DSL network termination devices for DSL service are installed at subscriber sites. The DSL technology dramatically increases the digital capacity of ordinary subscriber lines into the subscriber site, that is, home or office. DSL includes two types of usage: Asymmetric DSL (ADSL) and Symmetric DSL (SDSL or HDSL). ADSL is used for Internet access, where fast downstream Is required, but slow upstream is acceptable. SDSL is designed for short haul connections that require high speed in both directions.

In the case where the electrical power fed into a DSL network termination device fails or drops to an unacceptable voltage level, it is necessary to feed necessary power to the DSL network termination device to ensure at least telephone communication.

As a conventional power feeding method, a large-capacity battery or capacitor is installed in the DSL network termination device and, in the event of a problem, it is used as backup power. However, such a large-capacity battery can provide necessary power for only a limited time period.

As another conventional method, central office-side line termination equipment feeds the subscriber-side DSL network termination device with electrical power through the subscriber line. In this case, DC power is superimposed on a data/voice signal. Therefore, as disclosed in Japanese Patent Application Unexamined Publication No. 6-311206, a power splitting filter for extracting DC power from the subscriber line is needed in a digital service unit (DSU).

Such a power feed system from network to subscriber, however, causes high power losses due to the high impedance of a subscriber line, reducing power-feeding efficiency.

SUMMARY OF THE INVENTION

An object of the present invention is to provide a remote power feed method and system allowing efficient remote power feeding into a network termination device even when a power failure occurs at a subscriber site.

Another object of the present invention is to provide a remote power feed method and system allowing efficient remote power feeding into a network termination device even when a power failure occurs at a subscriber site while ensuring at least voice communication service.

According to the present invention, in a method for feeding power to a subscriber-side network termination device connected to a central office-side line termination device through a subscriber line, wherein the subscriber-side network termination device is normally powered by a commercial power source, the subscriber-side network termination device determines whether a commercial power failure occurs and, when the commercial power failure occurs, transmits a power failure signal to the central office-side line termination device. The central office-side line termination device, when receiving the power failure signal from the subscriber-side network termination device, feeds power to the subscriber-side network termination device via the subscriber line.

The subscriber line may provide a plurality of channels for communication between the central office-side line termination device and the subscriber-side network termination device to allow data communication and voice communication. The subscriber-side network termination device may supply power fed by the central office-side line termination device to only circuits required for the voice communication during the commercial power failure. Only at least one channel required for the voice communication may be used during the commercial power failure.

According to another aspect of the present invention, in a method for feeding power to a subscriber-side network termination device connected to a central office-side line termination device through a subscriber line providing a DSL (Digital Subscriber Line) service, wherein the subscriber-side network termination device is normally powered by a commercial power source, the subscriber-side network termination device determines whether a commercial power failure occurs. When the commercial power failure occurs, a power failure signal is transmitted to the central office-side line termination device by using a signaling bit and, when the commercial power source is restored, a power restoration signal is transmitted to the central office-side line termination device by using a signaling bit. The central office-side line termination device starts DC (direct current) remote power feeding to the subscriber-side network termination device via the subscriber line when receiving the power failure signal from the subscriber-side network termination device. When receiving the power restoration signal from the subscriber-side network termination device, the DC power is stopped feeding to the subscriber-side network termination device via the subscriber line. The subscriber-side network termination device extracts the DC power from the subscriber line to supply it to circuits In the subscriber-side network termination device until the commercial power source has been restored.

The subscriber line may provide a plurality of upstream channels and a plurality of downstream channels, allowing data and voice communications between the central office-side line termination device and the subscriber-side network termination device.

The subscriber-side network termination device preferably monitors quality of communication for each of the plurality of downstream channels and selects at least one high-quality downstream channel from the plurality of downstream channels based on monitored qualities of communication when the commercial power source is normally operating. The central office-side line termination device is preferably notified of the at least one high-quality downstream channel by using a signaling bit. The central off ice-side line termination device preferably monitors quality of communication for each of the plurality of upstream channels and selects at least one high-quality upstream channel from the plurality of upstream channels based on monitored qualities of communication when the commercial power source is normally operating, monitoring. The subscriber-side network termination device is preferably notified of the at least one high-quality upstream channel.

When the commercial power failure occurs, the voice communication is preferably performed between the central office-side line termination device and the subscriber-side network termination device using the at least one high-quality upstream channel and the at least one high-quality downstream channel.

According to the present invention, the subscriber-side network termination device includes a network termination circuit; a power extractor for extracting DC power from the subscriber line to supply it to circuits in the subscriber-side network termination device; a commercial power monitor for determining whether a commercial power failure occurs; and a first controller for controlling the network termination circuit and the power extractor such that, when the commercial power-failure occurs, the power extractor extracts the DC power from the subscriber line, the network termination circuit transmits a power failure signal to the central office-side line termination device by using a signaling bit and, when the commercial power source is restored, the network termination circuit transmits a power restoration signal to the central office-side line termination device by using a signaling bit. The central office-side line termination device includes a line termination circuit; a remote power feeding circuit for feeding the DC power into the subscriber line; and a second controller for controlling the line termination circuit and the remote power feeding circuit such that, when the power failure signal is received from the subscriber-side network termination device, the remote power feeding circuit starts the remote DC power feeding to the subscriber-side network termination device via the subscriber line and, when the power restoration signal is received from the subscriber-side network termination device, the remote power feeding circuit stops the remote DC power feeding to the subscriber-side network termination device via the subscriber line.

The subscriber-side network termination device may further include an analog subscriber circuit connected to a telephone terminal for the voice communication. The subscriber-side network termination device may further include a voice data compression encoder/decoder connected to the analog subscriber circuit connected to a telephone terminal for the voice communication. The subscriber-side network termination device may further include an ISDN line termination circuit connected to a telephone terminal for the voice communication.

As described above, according to the present invention, in the event of commercial power failure at the subscriber site, the central office-side line termination device can feed power into the subscriber-side network termination device through the subscriber line. In the case where the electrical power fails at the subscriber-side network termination device, only the bandwidth required for telephone service is ensured, allowing necessary communication capability to be left and resulting in reduced power fed by the central office-side line termination device. Therefore, at least telephone service can be maintained.

Further, since the remote power feeding into the subscriber line is performed only when commercial power failure occurs, the remote power feeding efficiency is expected to be dramatically improved.

DETAILED DESCRIPTION OF THE PREFERRED EMBODIMENTS

In the following embodiments, a high-speed digital interface such as ADSL or SBSL is used to transmit voice packets and thereby a subscriber can obtain the telephone service.

Figure 1:
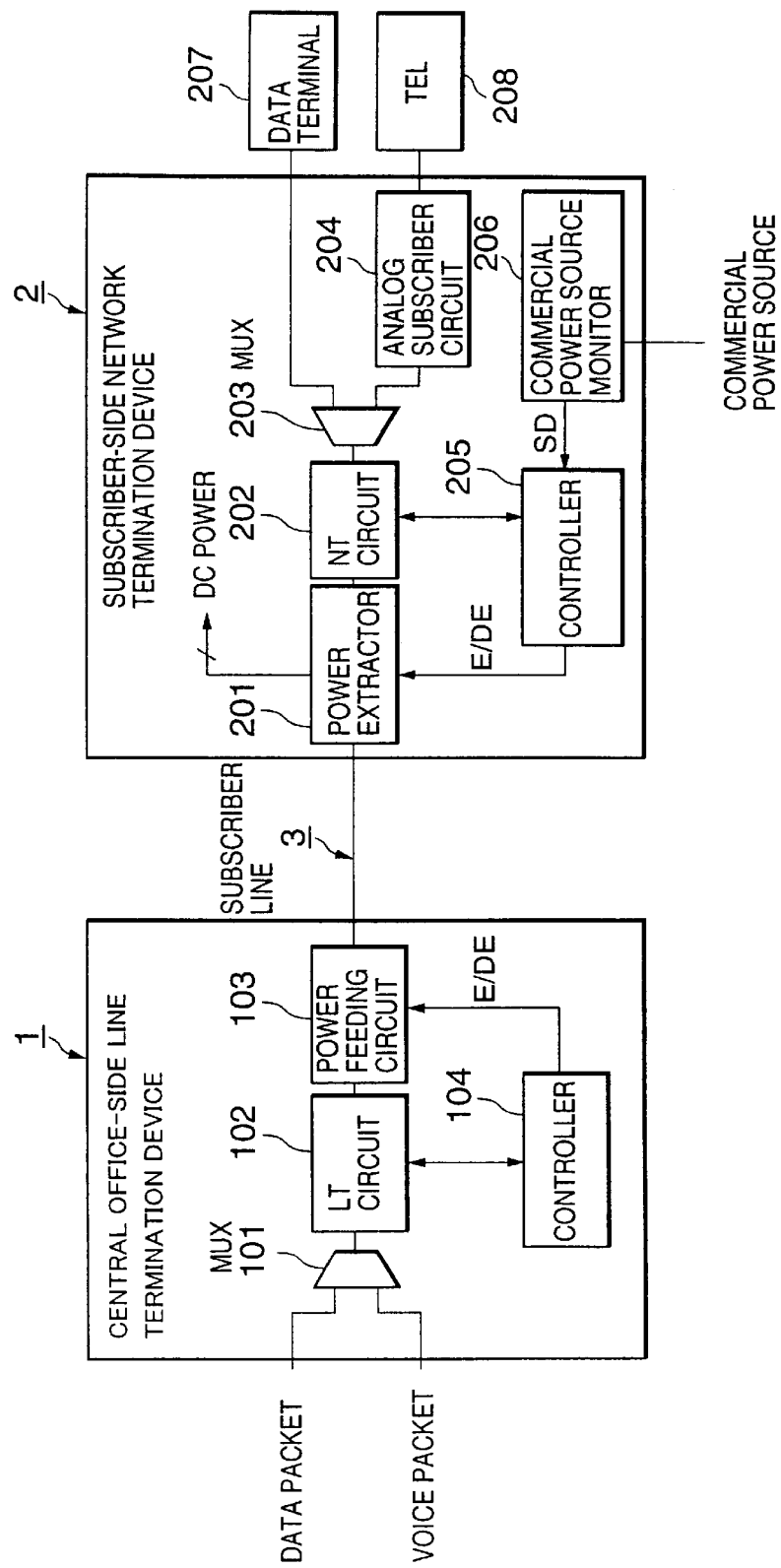
FIG. 1 is a block diagram showing a remote power feed system according to a first embodiment of the present invention.

Referring to FIG. 1, a subscriber line system includes a central office-side line termination device 1, a subscriber-side network termination device 2, which are connected through a subscriber line 3 providing the DSL service. As described later, the subscriber-side network termination device 2 has a power failure detecting and notifying function and a line-power receiving function. The central office-side line termination device 1 has a line-power feeding function depending on whether a power failure occurs at the subscriber-side network termination device 2.

Central Office-side Line Termination Device

The central office-side line termination device 1 includes a multiplexer/demultiplexer (hereafter, simply called "MUX") 101, a line termination circuit 102, a remote power feeding circuit 103, a controller 104, and other necessary circuits (not shown for simplicity). The MUX 101 multiplexes received data packets and voice packets into one stream of packets and outputs it to the line termination circuit 102. The line termination circuit 102 assembles frames including specific frames for signaling from the packet stream received from the MUX 101 and performs predetermined modulation (here, DMT; Discrete Multitone, and QAM: Quadrature Amplitude Modulation) according to the frame data to produce a transmission signal. The transmission signal is transmitted to the subscriber line 3 through the remote power feeding circuit 103.

The remote power feeding circuit 103 superimposes DC power on the transmission signal depending on an enable/disenable control signal (E/DE) received from the controller 104. More specifically the remote power feeding circuit 103 normally transfers the transmission signal as it is to the subscriber line 3 when a disenable control signal is received. Contrarily, when an enable control signal is received, the remote power feeding circuit 103 starts remote power feeding into the subscriber line 3 by superimposing the DC power on the transmission signal.

As described later, the controller 104 normally outputs the disenable control signal to the remote power feeding circuit 103 and, when a power failure signal has been received from the subscriber-side network termination device 2, outputs the enable control signal to the remote power feeding circuit 103.

When a signal has been received from the subscriber-side network termination device 2 through the subscriber line 3, the line termination circuit 102 demodulates the received signal according to the predetermined modulation scheme (here, QAM and DMT) to produce received frame data and disassembles the received frame data into a stream of packets. The MUX 101 demultiplexes the received stream of packets into data packets and voice packets. Further, the line termination circuit 102 has a function of checking a signaling bit included in a specific frame to see whether a power failure occurs at the subscriber-side network termination device 2. If the power failure has occurred, then the line termination circuit 102 notifies the controller 104 of the occurrence of power failure.

In addition to the above-described control operations, the controller 104 performs carrier selection and remote power feeding operations in the event of a power failure. The details will be described later.

Subscriber-side Network Termination Device

The subscriber-side network termination device 2 includes a power extractor 201, a network termination circuit 202, a MUX 203, an analog subscriber circuit 204, a controller 205, a commercial power source monitor 206, and other necessary circuits (not shown for simplicity). The subscriber-side network termination device 2 is normally powered by the commercial power source. The data input/output port of the MUX 203 is connected to a data terminal 207 and the analog input/output port thereof is connected to a telephone terminal 208 through the analog subscriber circuit 204.

The power extractor 201 is connected to the subscriber line 3 and extracts DC power from the subscriber line 3 depending on an enable/disenable control signal (E/DE) received from the controller 205. More specifically, the power extractor 201 normally transfers a received signal on the subscriber line 3 as it is to the network termination circuit 202 when a disenable control signal is received. Contrarily, when an enable control signal is received, the power extractor 201 extracts the DC power from the received signal on the subscriber line 3, for example, using a power splitting filter, The extracted DC power is supplied to necessary circuits in the subscriber-side network termination device 2. Here, the circuits in an analog telephone system are fed with the DC power.

As described later, the controller 205 normally outputs the disenable control signal to the power extractor 201 and, when a power failure detection signal SD is received from the commercial power source monitor 206, outputs the enable control signal to the power extractor 201.

When a signal has been received from the central office-side line termination device 1 through the subscriber line 3, the network termination circuit 202 demodulates the received signal according to the predetermined modulation scheme (here, QAM and DMT) to produce received frames and disassembles the received frames into a stream of packets. The MUX 203 demultiplexes the received stream of packets into data packets and voice packets, which are output to the data terminal 207 and the analog subscriber circuit 204, respectively. The voice packets are converted by the analog subscriber circuit 204 into an analog voice signal and outputs it to the telephone terminal 208.

The analog subscriber circuit 204 performs a conversion from an analog voice signal received from the telephone terminal 208 to voice packets and a conversion from voice packets received from the network termination circuit 202 to an analog voice signal. The analog subscriber circuit 204 further has BORSHT function and may be provided with a buffer absorbing variations in arrival time of a voice packet.

When receiving packets from the data terminal 207 and the analog subscriber circuit 204, the MUX 203 multiplexes received data packets and voice packets into one stream of packets and outputs it to the network termination circuit 202. The network termination circuit 202 assembles frames including specific frames for signaling from the packet stream received from the MUX 203 and performs predetermined modulation on the frames to produce a transmission signal. The transmission signal is transmitted to the subscriber line 3 through the power extractor 201.

Further, the network termination circuit 202 has a function of assigning power failure detection information to a signaling bit included in a specific frame to notify the central office-side line termination device 1 of the occurrence of power failure. The commercial power source monitor 206 monitors the commercial power source to determine whether the commercial power fed into the network termination device 2 fails or drops to an unacceptable voltage level. If such a power failure occurs, then the commercial power source monitor 206 outputs the power failure detection signal SD to the controller 205.

As described before, when receiving the power failure detection signal SD, the controller 205 outputs the enable control signal to the power extractor 201 and instructs the network termination circuit 202 to assign the power failure detection information to the signaling bit included in a specific frame to notify the central office-side line termination device 1.

When receiving the power failure detection information, as described before, the central office-side line termination device 1 starts remote power feeding into the subscriber line 3 by superimposing the DC power on the transmission signal. The subscriber-side network termination device 2 may be provided with a backup battery or capacitor so as to ensure necessary power until the DC power is fed to the subscriber line 3.

In addition to the above-described control operations, the controller 205 performs carrier selection and power receiving operations in the event of a power failure. The details will be described hereafter.

ADSL DMT Carrier Selection

A carrier selection operation in the case of ADSL DMT (Discrete Multi Tone) system will be described by referring to FIG. 2.

Figure 2:
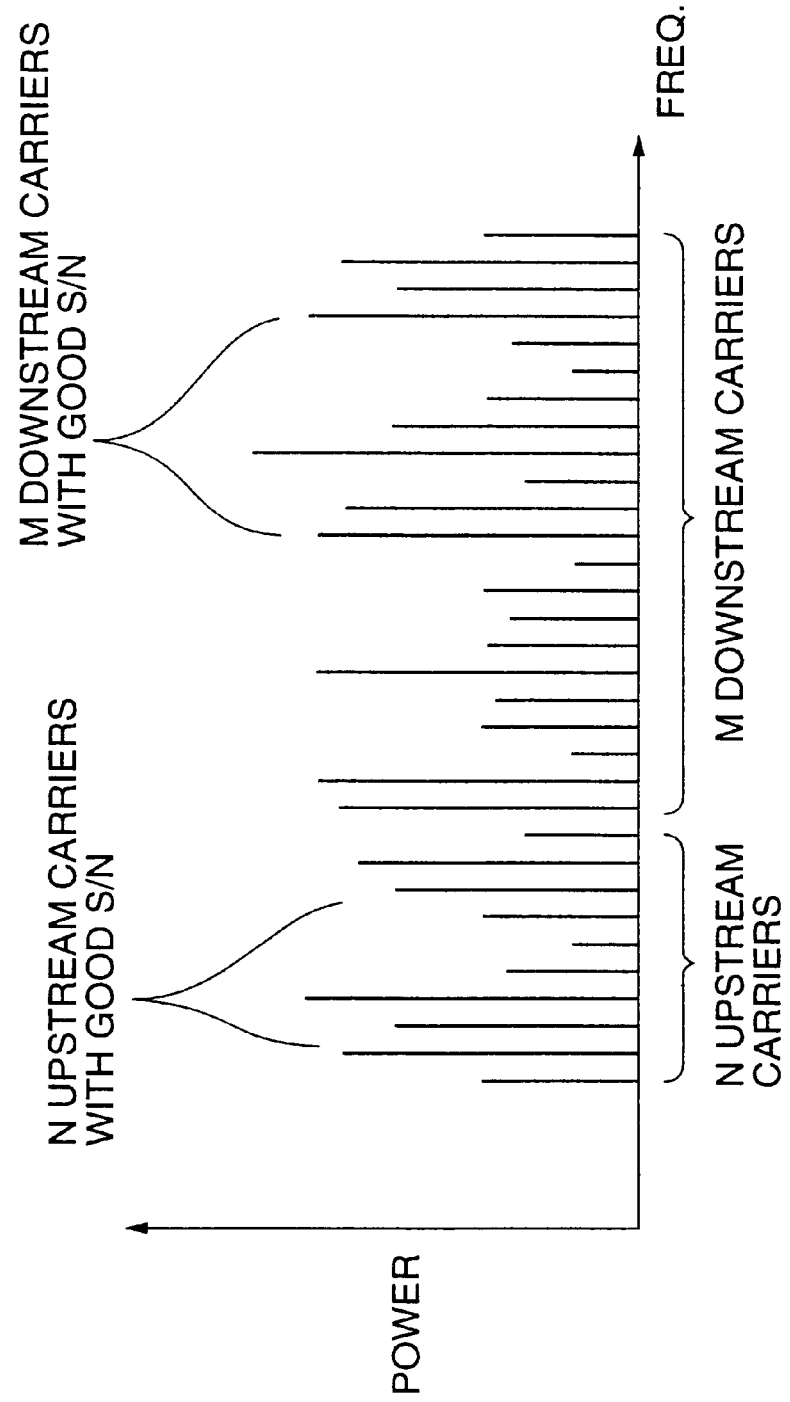
FIG. 2 is a diagram showing an example of a power spectrum distribution in DMT ADSL system when normally operating.

As shown in FIG. 2, when normally transmitting data/voice signals between the central office-side line termination device 1 and the subscriber-side network termination device 2, N carriers (channels) are used for upstream transmission from the subscriber-side network termination device 2 to the central office-side line termination device 1. M carriers (channels) higher than the N upstream carriers are used for downstream transmission from the central office-side line termination device 1 to the subscriber-side network termination device 2, where M>N in ADSL DMT. The power spectrum distribution as shown in FIG. 2 is developed on the subscriber line 3 after synchronization between the central office-side line termination device 1 and the subscriber-side network termination device 2 has been established by a predetermined sequence. Here, each carrier has been modulated according to QAM scheme as described before.

At the central office-side line termination device 1 normally operating, the controller 104 monitors the quality of communication. (here, a signal-to-noise ratio (S/N)), for each upstream carrier through the line termination circuit 102 and selects n best S/N upstream carriers from the N upstream carriers. The selected carrier Information indicating the n best S/N upstream carriers is transmitted to the subscriber-side network termination device 2 using signaling bits included in specific frames.

Similarly, at the subscriber-side network termination device 2 normally operating, the controller 205 monitors a signal-to-noise ratio (S/N) for each downstream carrier through the network termination circuit 202 and selects m best S/N downstream carriers from the M downstream carriers. The selected carrier information indicating the m best S/N downstream carriers is transmitted to the central office-side line termination device 1 using signaling bits included in specific frames.

In this manner, the upstream carriers are monitored and the n best upstream carriers are selected by the central office-side line termination device 1. The downstream carriers are monitored and the m best downstream carriers are selected by the subscriber-side network termination device 2. Therefore, the central office-side line termination device 1 is notified of the best m downstream carriers and therefore holds the best m downstream channels and the best n downstream channels at that time. Similarly, since the subscriber-side network termination device 2 is notified of the n best upstream carriers, the best n upstream channels and the best m downstream channels at that time are stored.

In such a normal transmission operation, the subscriber can obtain both data communication service and telephone service using the data terminal 207 and the telephone terminal 208, respectively.

Operations in the Event of Power Failure

When a commercial power failure occurs at the subscriber-side network termination device 2, the commercial power source monitor 206 outputs the power failure detection signal SD to the controller 205. When receiving the power failure detection signal SD, the controller 205 outputs the enable control signal to the power extractor 201 and instructs the network termination circuit 202 to notify the central office-side line termination device 1 of the power failure occurrence. As described before, the backup battery may be used until the remote power feeding circuit 103 of the central office-side line termination device 1 feeds the DC power into the subscriber line 3.

Further, when receiving the power failure detection signal SD, the controller 205 starts a power saving operation such that only telephone service can be obtained.

Figure 3:
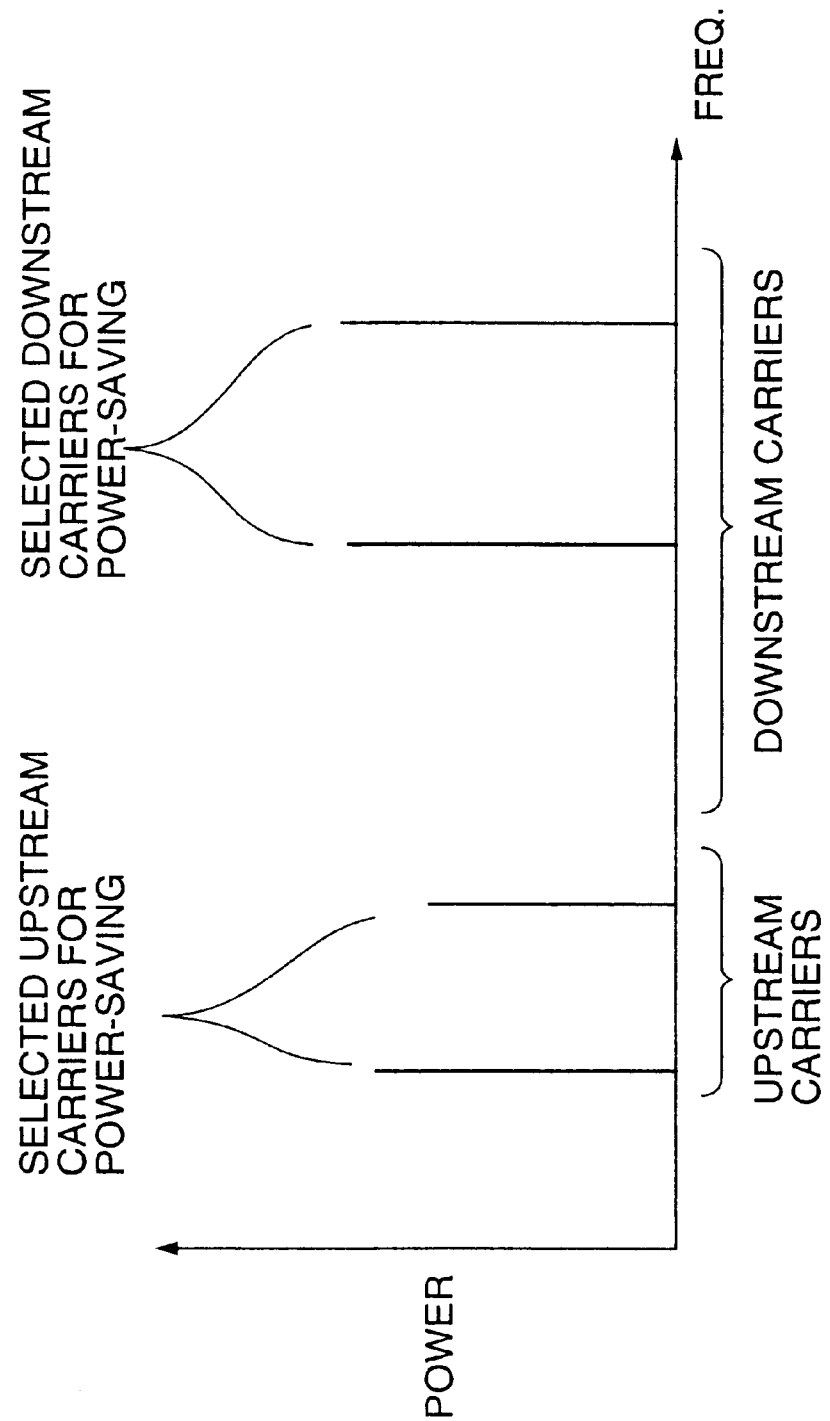
FIG. 3 is a diagram showing an example of a power spectrum distribution in the case of DMT ADSL system in the case of power saving.

As shown in FIG. 3, the controller 205 stores selected carrier data indicating the selected n upstream carriers and the selected m downstream carriers as described before. In the power saving operation, these selected upstream/downstream carriers are assigned to only telephone service to ensure telephone communications even in the case of commercial power failure.

In this case, the MUX 203 may discard packets received from the data terminal 207. Since a smaller number of carriers are used, the total power consumption can be reduced, compared with in the case of the normal operation, Further, since modulation/demodulation is performed on the smaller number of carriers, the amount of calculation in the network termination circuit 202 can be reduced, resulting in further reduction in power consumption.

When the central office-side line termination device 1 is notified of the occurrence of a commercial power failure, the controller 104 outputs the enable control signal to the remote power feeding circuit 103. This causes the remote power feeding circuit 103 to start remote power feeding into the subscriber line 3 by applying a necessary DC voltage to the subscriber line 3.

Further, at the central office-side line termination device 1, the controller 104 also stores the same selected carrier data as in the subscriber-side network termination device 2 (see FIG. 3). Therefore, these selected upstream/downstream carriers are assigned to only telephone service to ensure telephone communications even in the case of commercial power failure.

In this case, the MUX 101 may discard data packets. Since a smaller number of carriers are used, the total power consumption can be reduced, compared with in the case of the normal operation. Further, since modulation/demodulation is performed on the smaller number of carriers, the amount of calculation in the network termination circuit 202 can be reduced, resulting in further reduction in power consumption.

At the subscriber-side network termination device 2, the power extractor 201 extracts the DC power on the subscriber line 3 and supplies the DC power to necessary circuits for telephone communication during the commercial power failure.

When the commercial power source monitor 206 detects that normal operation is restored to the commercial power source, the controller 205 instructs the network termination circuit 202 to assign power restoration information to the signaling bit to notify the central office-side line termination device 1. Further, the controller 205 outputs the disenable control signal to the power extractor 201 to restore the normal operation, At the central office-side line termination device 1, when receiving the power restoration information from the subscriber-side network termination device 2, the controller 104 outputs the disenable control signal to the remote power feeding circuit 103 so as to stop remote power feeding into the subscriber line 3.

Figure 4:
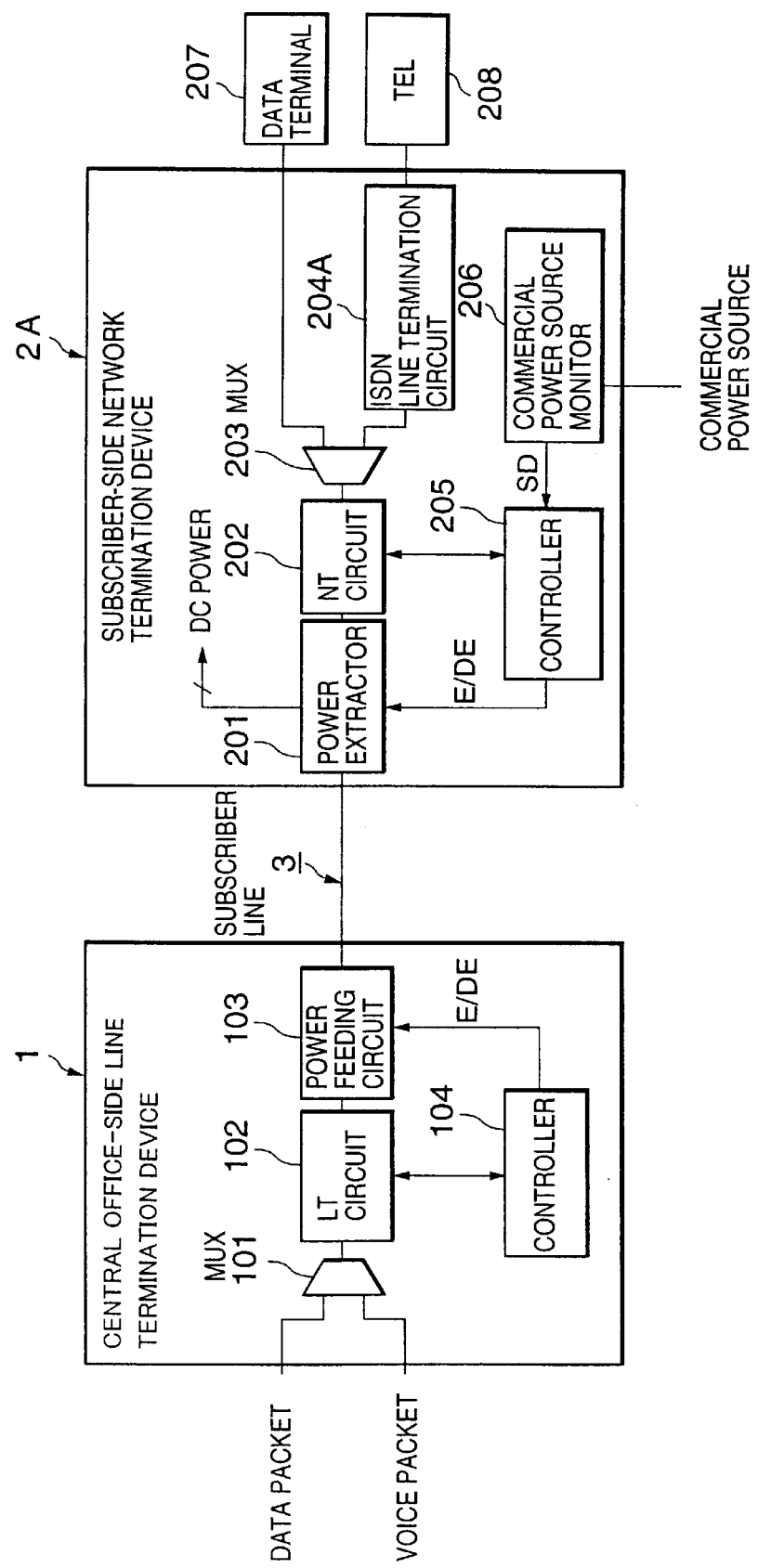
FIG. 4 is a block diagram showing a remote power feed system according to a second embodiment of the present invention.

Referring to FIG. 4, a subscriber-side network termination device 2A may be provided with an ISDN (Integrated services Digital Network) termination circuit 204A in place of the analog subscriber circuit 204. In this case, the ISDN termination circuit 204A has a function of terminating physical layer, data link layer. and network layer.

Figure 5:
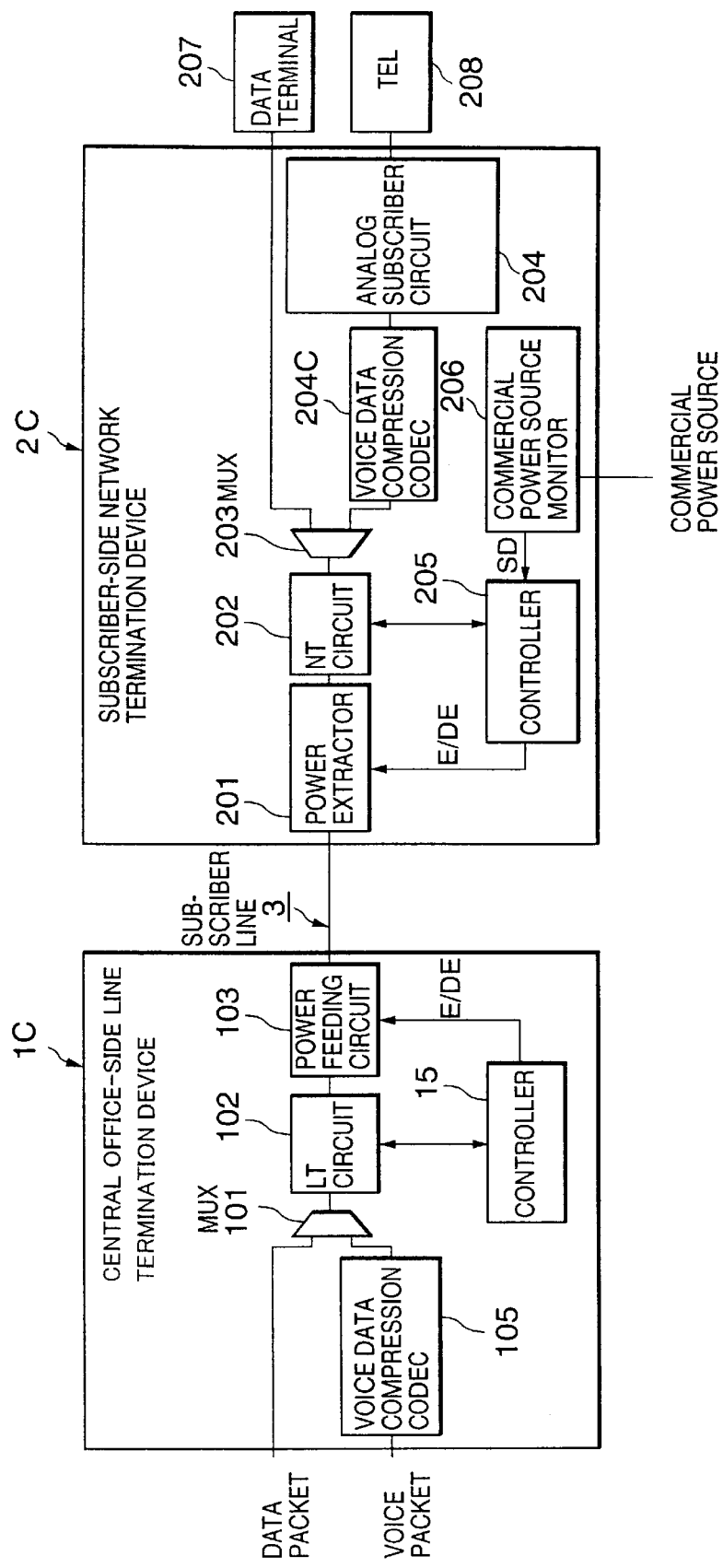
FIG. 5 is a block diagram showing a remote power feed system according to a third embodiment of the present invention.

Referring to FIG. 5, voice data compression may be made In a voice communication system. More specifically, the central office-side line termination device 1C is provided with a voice data compression CODEC (coder/decoder) 105 connected to the voice input port of the MUX 101. The subscriber-side network termination device 2C is provided with a voice data compression CODEC 204C connected between the MUX 203 and the analog subscriber circuit 204.

As described above, according to the present invention, in the event of commercial power failure at the subscriber site, the central office-side line termination device can feed power into the subscriber-side network termination device through the subscriber line. Therefore, at least telephone service can be maintained.

Further, in the case where the electrical power fails at the subscriber-side network termination device, only the bandwidth required for telephone service is ensured, allowing necessary communication capability to be left and resulting in reduced power fed by the central office-side line termination device.

It is true that high power losses are caused by the high impedance of a subscriber line, reducing remote power feeding efficiency. However, according to the present invention, only "when a commercial power failure occurs, the remote power feeding into the subscriber line is performed. Therefore, compared with the prior art, the remote power feeding efficiency is expected to be dramatically improved.

What is claimed is:

1. A method for feeding power to a subscriber-side network termination device connected to a central office-side line termination device through a subscriber line, wherein the subscriber-side network termination device is normally powered by a commercial power source, comprising the steps of:

at the subscriber-side network termination device, extracting DC power using a power extractor from the subscriber line to supply it to circuits in the subscriber-side network termination device;

determining whether a commercial power failure occurs;

controlling a network termination circuit and the power extractor such that, when the commercial power failure occurs, the power extractor extracts the DC power from the subscriber line, the network termination circuit transmits a power failure signal to the central office-side line termination device by using a signaling bit and, when the commercial power source is restored, the network termination circuit transmits a power restoration signal to the central office-side line termination device by using a signaling bit;

at the central office-side line termination device, feeding the DC power into the subscriber line using a remote power feeding circuit;

controlling a line termination circuit and the remote power feeding circuit such that, when the power failure signal is received from the subscriber-side network termination device, the remote power feeding circuit starts the DC power feeding to the subscriber-side network termination device via the subscriber line and, when the power restoration signal is received from the subscriber-side network termination device, the remote power feeding circuit stops the DC power feeding to the subscriber-side network termination device via the subscriber line.

2. The method according to claim 1, wherein the subscriber line provides a plurality of channels for communication between the central office-side line termination device and the subscriber-side network termination device to allow data communication and voice communication.

3. The method according to claim 2, further comprising the step of:

at the subscriber-side network termination device, supplying power fed by the central office-side line termination device to only circuits required for the voice communication during the commercial power failure.

4. The method according to claim 3, further comprising the step of:

using only at least one channel required for the voice communication during the commercial power failure.

5. A method for feeding power to a subscriber-side network termination device connected to a central office-side line termination device through a subscriber line providing a DSL (Digital Subscriber Line) service, wherein the subscriber-side network termination device is normally powered by a commercial power source, comprising the steps of:

at the subscriber-side network termination device, a) determining whether a commercial power failure occurs;

b) when the commercial power failure occurs, transmitting a power failure signal to the central office-side line termination device by using a signaling bit;

c) when the commercial power source is restored, transmitting a power restoration signal to the central office-side line termination device by using a signaling bit;

at the central office-side line termination device, d) when receiving the power failure signal from the subscriber-side network termination device, starting remote DC (direct current) power feeding to the subscriber-side network termination device via the subscriber line;

e) when receiving the power restoration signal from the subscriber-side network termination device, stopping the remote DC power feeding to the subscriber-side network termination device via the subscriber line;

f) when the commercial power source is normally operating, monitoring quality of communication for each of the plurality of upstream channels;

selecting at least one high-quality upstream channel from the plurality of upstream channels based on monitored qualities of communication; and notifying the subscriber-side network termination device of the at least one high-quality upstream channel;

at the subscriber-side network termination device;

g) extracting the DC power from the subscriber line to supply it to circuits in the subscriber-side network termination device until the commercial power source has been restored; and h) when the commercial power source is normally operating, monitoring quality of communication for each of the plurality of downstream channels;

selecting at least one high-quality downstream channel from the plurality of downstream channels based on monitored qualities of communication; and notifying the central office-side line termination device of the at least one high-quality downstream channel by using a signaling bit, wherein the subscriber line provides a plurality of upstream channels and a plurality of downstream channels, allowing data and voice communications between the central office-side line termination device and the subscriber-side network termination device.

6. The method according to claim 5, wherein in the step (g), the DC power fed by the central office-side line termination device is supplied to only circuits required for the voice communication until the commercial power source has been restored.

7. The method according to claim 5, further comprising the steps of:

when the commercial power failure occurs, performing the voice communication between the central office-side line termination device and the subscriber-side network termination device using the at least one high-quality upstream channel and the at least one high-quality downstream channel.

8. A system for feeding power to a subscriber-side network termination device connected to a central office-side line termination device through a subscriber line providing a DSL (Digital Subscriber Line) service, wherein the subscriber-side network termination device is normally powered by a commercial power source, wherein the subscriber-side network termination device comprises:

a network termination circuit;

a power extractor for extracting DC power from the subscriber line to supply it to circuits in the subscriber-side network termination device:

a commercial power monitor for determining whether a commercial power failure occurs; and a first controller for controlling the network termination circuit and the power extractor such that, when the commercial power failure occurs, the power extractor extracts the DC power from the subscriber line, the network termination circuit transmits a power failure signal to the central office-side line termination device by using a signaling bit and, when the commercial power source is restored, the network termination circuit transmits a power restoration signal to the central office-side line termination device by using a signaling bit, and the central office-side line termination device comprises:

a line termination circuit;

a remote power feeding circuit for feeding the DC power into the subscriber line; and a second controller for controlling the line termination circuit and the remote power feeding circuit such that, when the power failure signal is received from the subscriber-side network termination device, the remote power feeding circuit starts the DC power feeding to the subscriber-side network termination device via the subscriber line and, when the power restoration signal is received from the subscriber-side network termination device, the remote power feeding circuit stops the DC power feeding to the subscriber-side network termination device via the subscriber line.

9. The system according to claim 8, wherein the subscriber line provides a plurality of upstream channels and a plurality of downstream channels, allowing data and voice communications between the central office-side line termination device and the subscriber-side network termination device.

10. The system according to claim 8, wherein the power extractor supplies the extracted DC power to only circuits required for the voice communication until the commercial power source has been restored.

11. The system according to claim 9, wherein the first controller monitors quality of communication for each of the plurality of downstream channels when the commercial power source is normally operating, selects at least one high-quality downstream channel from the plurality of downstream channels based on monitored qualities of communication, and instructs the network termination circuit to notify the central office-side line termination device of the at least one high-quality downstream channel by using a signaling bit, and the second controller monitors quality of communication for each of the plurality of upstream channels when the commercial power source is normally operating, selects at least one high-quality upstream channel from the plurality of upstream channels based on monitored qualities of communication, and instructs the line termination circuit to notify the subscriber-side network termination device of the at least one high-quality upstream channel.

12. The system according to claim 11, wherein, when the commercial power failure occurs, the first and second controllers perform the voice communication between the central office-side line termination device and the subscriber-side network termination device using the at least one high-quality upstream channel and the at least one high-quality downstream channel.

13. The system according to claim 8, wherein the subscriber-side network termination device further comprises an analog subscriber circuit connected to a telephone terminal for the voice communication.

14. The system according to claim 13, wherein the subscriber-side network termination device further comprises a voice data compression encoder/decoder connected to the analog subscriber circuit connected to a telephone terminal for the voice communication.

15. The system according to claim 8, wherein the subscriber-side network termination device further comprises an ISDN line termination circuit connected to a telephone terminal for the voice communication.

* * * * *